United States Patent [19]

Ishiyama et al.

[11] Patent Number: 5,215,292
[45] Date of Patent: Jun. 1, 1993

[54] FLUID FILLED VIBRATION DAMPING MOUNT WITH BRIDGE REINFORCED AIR CHAMBER

[75] Inventors: Tatsuro Ishiyama, Yokohama; Toshiyuki Tabata, Sagamihara, both of Japan

[73] Assignees: Nissan Motor Co., Ltd., Yokohama; Bridgestone Corp., Tokyo, both of Japan

[21] Appl. No.: 551,383

[22] Filed: Jul. 12, 1990

[30] Foreign Application Priority Data

Jul. 14, 1989 [JP] Japan ................................ 1-182116

[51] Int. Cl.⁵ ........................ F16F 13/00; B60K 5/12
[52] U.S. Cl. ........................... 267/140.12; 267/141.2; 267/219; 248/562; 248/631
[58] Field of Search ............ 267/35, 140.1 C, 140.1 R, 267/140.5, 141.2, 219; 248/562, 604, 609, 631, 634, 636

[56] References Cited

U.S. PATENT DOCUMENTS

| | | | |
|---|---|---|---|
| 4,416,445 | 11/1983 | Coad | 248/562 X |
| 4,717,111 | 1/1988 | Saito | 267/140.1 C X |
| 4,728,086 | 3/1988 | Ishiyama et al. | 267/140.1 C |
| 4,861,004 | 9/1989 | Yokota et al. | 267/140.1 C |
| 4,895,353 | 1/1990 | Roth et al. | 267/140.1 C |
| 4,909,489 | 3/1990 | Doi | 267/141.2 X |
| 4,923,178 | 5/1990 | Matsumoto et al. | 267/140.1 C |

FOREIGN PATENT DOCUMENTS 63-318339 of 1988 Japan .
2207214 6/1988 United Kingdom .

*Primary Examiner*—Robert J. Oberleitner
*Assistant Examiner*—Josie A. Ballato
*Attorney, Agent, or Firm*—Pennie & Edmonds

[57] ABSTRACT

An opening which is formed in a cylindrical outer housing of a bush and which facilitates the draining of superfluous working fluid after an assembly process which is carried out totally immersed in the fluid, and which is reinforced by a bridged portion which extends in the direction in which a force and reaction to that force act and spans the opening so as to resist deformation when the bush is force fitted into an associated bracket.

14 Claims, 9 Drawing Sheets

FLUID FILLED VIBRATION DAMPING MOUNT WITH BRIDGE REINFORCED AIR CHAMBER

BACKGROUND OF THE INVENTION

1. Field of the Invention

The present invention relates generally to fluid filled vibration damping mounts such as used to support power units, cabs and/or body structures on vehicle chassis and the like and more specifically to such a type mount which features improved rigidity against axially acting and the like type forces.

2. Description of Prior Art

JP-A-63-318339 discloses a so called bush type of vibration damping mount which is used to support engines, cabs and/or body structures on vehicle chassis wherein two coaxial essentially horizontally (parallel) arranged inner and outer structural members are supportingly connected by way of an elastomeric body.

This arrangement includes an expansion chamber which is defined between the inner member and the elastomeric body and a working chamber which is defined between the elastomeric body and the outer member. The working and expansion chambers are fluidly interconnected by an orifice passage in a manner which enables vibration which is applied to the bush to be attenuated by pumping a working fluid back and forth between the two chambers.

This particular mount is such that the elastomeric body is vulcanized to the inner member along with a rigid insert member. The latter mentioned insert is arranged to have an orifice defining recess which communicates at its both ends with a fluid chamber defining recess formed in the elastomeric body. This combination is inserted into a cylindrical outer member which has an elastomeric layer partially vulcanized to a predetermined portion of the inner periphery thereof.

In order to ensure that the orifice passage and the fluid chamber are completely filled with working fluid and all air is excluded, it has been discovered that the assembly of the inner and outer members must be made while the components are totally immersed in the working fluid. The outer member is then subject to external compression in a manner to fix the two parts together into a single unit.

However, with this arrangement a problem has been encountered in that an air chamber which is defined between a portion of the elastomeric layer which is not vulcanized to the outer member and the outer member itself, is communicated with the ambient atmosphere by way of only a single relatively small diameter opening.

During the immersed assembly, the above mentioned air chamber becomes filled with working fluid which must be drained therefrom. However, due to the provision of the single small opening, the drainage of the same requires a long time and troublesome operations wherein each unit must be tilted and turned through various angles to induce draining. In fact total removal is impossible to achieve.

To overcome this, it has been proposed to provide a relatively large window type opening which opens into the air chamber. This has successfully overcome the draining problem and enable the ready cleaning of the air chamber but has in turned encountered a drawback in that, when the bush is forced fitted into a suitable section of a mounting bracket, a relatively large force needs to be applied to one end of the device in order to force it all the way home. This force acts along the longitudinal axis of the outer cylindrical member. However, the provision of the enlarged window reduces the structural strength of the outer member to the degree that during the force fitting process, buckling or otherwise undesired distortion of the outer member tends to occur.

Needless to say, such distortion can require that the unit be removed from the bracket and replaced with a new one. This of course leads to highly undesired increases in lost time and production costs.

SUMMARY OF THE INVENTION

It is an object of the present invention to provide a bush of the above described type which enables ready production while obviating the loss of structural rigidity which tends to plague the prior art arrangements.

In brief, the above object is achieved by an arrangement wherein, in order to improve the structural strength of the outer cylindrical housing of a fluid filled bush against deformation when the bush is force fitted into a bracket and an axially acting force is applied to one end of the housing, an opening, which is formed in the cylindrical outer housing and which facilitates the draining of superfluous working fluid after an assembly process with is carried out totally immersed in the fluid, is reinforced by a bridge portion which spans the opening and extends in the direction in which the forces generated during the force fitting act.

More specifically, a first aspect of the present invention comes in a bush comprising: outer and inner members, said outer and inner members being operatively interconnected by an elastomeric body and having first and second axes respectively, said inner member being disposed within the outer member so that the first and second axes are essentially parallel, said outer member being essentially cylindrical and so dimensioned as to be force fittable into the bush receiving portion of said mounting bracket; means defining a diaphragm which defines an air chamber between itself and a predetermined portion of said outer member; means defining an opening in the predetermined portion of said outer member; and reinforcing means for reinforcing the opening against forces which act in a direction parallel with said first and second axes.

A second aspect of the present invention takes the form of a bush which features: inner and outer members, the inner and outer members having first and second axes respectively, the inner member being disposed within the outer member so that the first and second axes are essentially parallel; an elastomeric layer, a first portion of the elastomeric layer being fixed to a first predetermined portion of the inner periphery of the outer member, a second part of the elastomeric layer being arranged to act as a diaphragm and to define an air chamber between itself and a second predetermined portion of the inner periphery of the outer member; an elastomeric body which is connected to the inner member and formed with a recess, the recess and the portion of the elastomeric layer which acts as a diaphragm, defining in combination with a structural member, chamber means which is filled with a working fluid; means defining a opening in the outer member which opens into the air chamber; and a reinforcing means which bridges the opening and extends in a direction essentially parallel with the first and second axes.

A third aspect of the present invention takes the form of a mounting structure which features: a mounting bracket, said mounting bracket having a bush receiving portion into which an essentially cylindrical bush can be force fitted; and a bush comprising: outer and inner members, said outer and inner members having first and second axes respectively, said inner member being disposed within the outer member so that the first and second axes are essentially parallel, said outer member being essentially cylindrical and so dimensioned as to be force fittable into the bush receiving portion of said mounting bracket; means defining a diaphragm which defines an air chamber between itself and a predetermined portion of said outer member; means defining an opening in the predetermined portion of said outer member; and reinforcing means which bridges the opening and extends in a direction essentially parallel with the first and second axes and which reinforces the opening against forces which are applied to the bush when it is force fitted into the bush receiving portion of said mounting bracket.

Further aspects of the present invention come in the provision of a protective layer which is formed on the inner surface of the reinforcing means and which is arranged to prevent said diaphragm from directly contacting said reinforcing means and undergoing unnecessary abrasion.

Another aspect of the present invention comes in that the reinforcing means is non-integral with the outer member and fixedly secured in place by means of bond or the like.

An air hole or holes can be formed in the reinforcing means and arranged to cooperate with a corresponding hole formed in the bracket into which the bush is fitted. The inboard end of the air hole can be reduced in diameter to prevent the diaphragm from bulging thereinto upon contact.

DETAILED DESCRIPTION OF THE PREFERRED EMBODIMENTS

Figure 1:
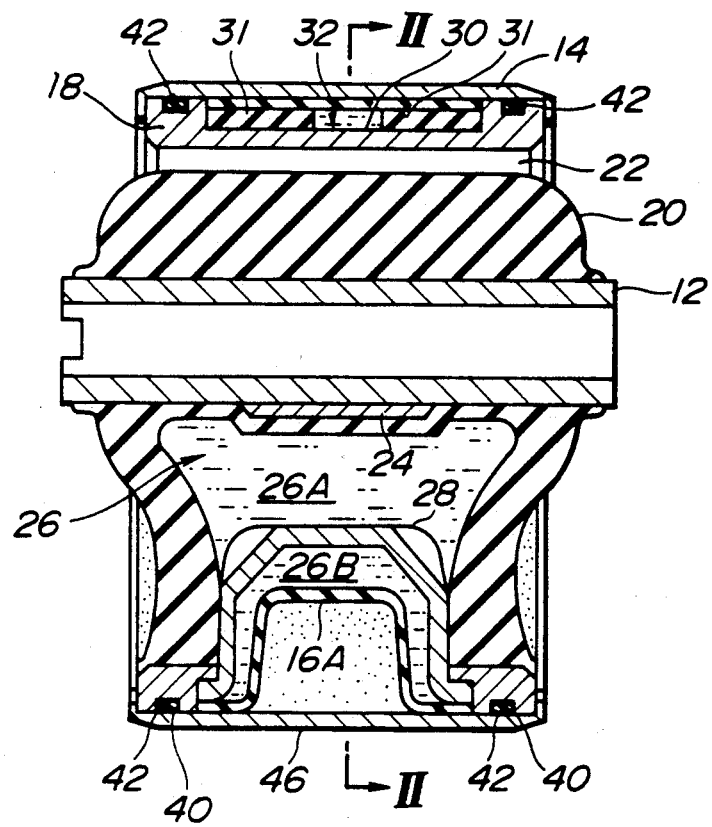
FIG. 1 is a side sectional view of a bush according to a first embodiment of the present invention as taken along section line 1—1 of FIG. 2.
Figure 2:
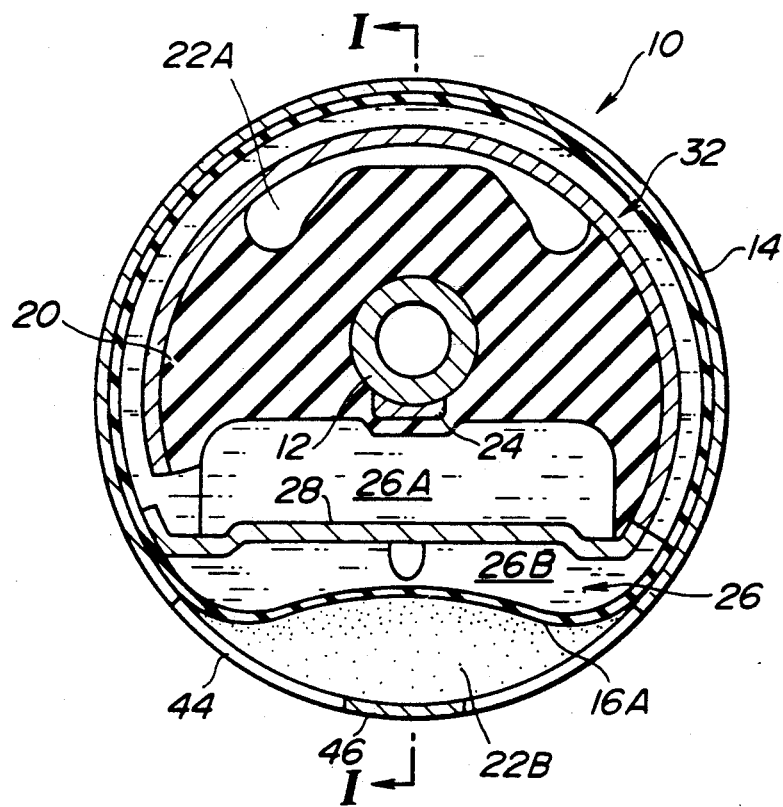
FIG. 2 is a front sectional elevation as taken along section line II—II of FIG. 1.

FIGS. 1 to 7 show a first embodiment of the present invention. In this arrangement a bush 10 comprises inner and outer tubular members 12 and 14 which are arranged so that the longitudinal axes thereof are essentially parallel with one another. One of the inner and outer members 12, 14 is adapted for connection to a source of vibration such as an internal combustion engine or a power unit, while the other is adapted for connection to a vehicle chassis.

In this instance, the outer member 14 is arranged to be force fitted into a cylindrical connection member 92 which forms part of a bracket 90 (see FIG. 7) which in turn is rigidly connected to the vehicle chassis.

An elastomeric layer 16 and a rigid annular intermediate member or insert 18 are arranged within outer member 14 in the illustrated manner. The elastomeric layer 16 is vulcanized to a selected portion of the inner periphery of the outer member 14.

The annular insert 18 and the inner member 12 are connected by an elastomeric body 20.

A metal insert 24 is rigidly connected to a predetermined portion of the lower surface of the inner member 12 and arranged to extend along in the axial direction thereof. This insert 24 juts out from the inner member and acts as a stopper.

An axially extending air space 22A is defined between a portion of the annular insert 18 and the elastomeric body 20. This air space 22A is formed in a manner to be located diametrically opposite the stopper 24 and to controllably reduce the compressive force which can be exerted by the elastomeric body in that direction.

A fluid chamber 26 is defined within the elastomeric member 20 at a location diametrically opposite the air space 22A. This working chamber is filled with water, oil or a suitable working fluid.

In this case the fluid chamber 26 is defined by moulding a radially extending blind recess in the elastomeric body 20. A partition member 28 (best seen in FIG. 3) is disposed in the mouth of the recess in the illustrated manner to close the same and partition the chamber into a working chamber 26A and an auxiliary expansion chamber 26B.

Figure 3:
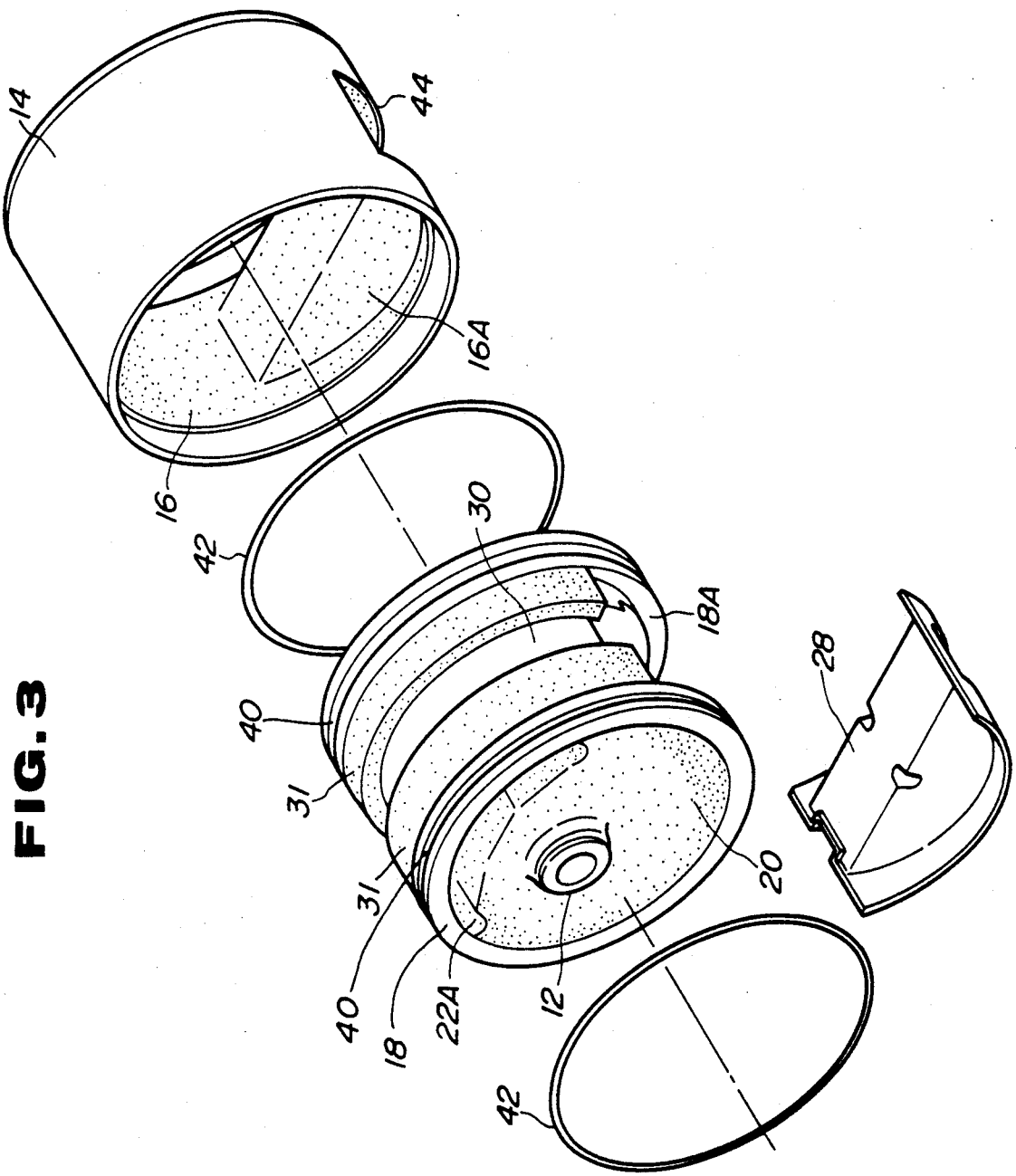
FIG. 3 is an exploded view showing the constructional features of the first embodiment.

As best appreciated from FIGS. 1 and 3, the partition member 28 is disposed in a cut-out 18A formed in a central portion of the annular insert 18 and arranged to project into the chamber 26B.

This cut-out 18A is formed with a L-shaped shoulder into which axially extending flange portions of the partition member 28 are received.

As shown in FIG. 3 the annular insert 18 is formed with an essentially C-shaped recess which is located at an axially mid section of the insert.

Elastomeric layers 31 are fixedly disposed along each side of the recess. As shown in FIG. 1 these layers 31 combine with the elastomeric layer 16 to define a control or orifice passage 32 which fluidly connects the working and expansion chamber 26A and 26B.

The annular insert 18 is formed with two circumferential grooves 40 which receive O-rings 42. These rings improve the sealing of the orifice passage 32.

The elastomeric layer 16 has a portion which is not fixedly connected to the inner periphery of the outer member 14 and which acts as a diaphragm 16A at a location opposite the outboard face of the partition member 28. This diaphragm separates the expansion chamber 26B from a second air chamber 22B which is defined between the inner surface of the outer member 14 and the outboard face of the diaphragm.

Figure 4:
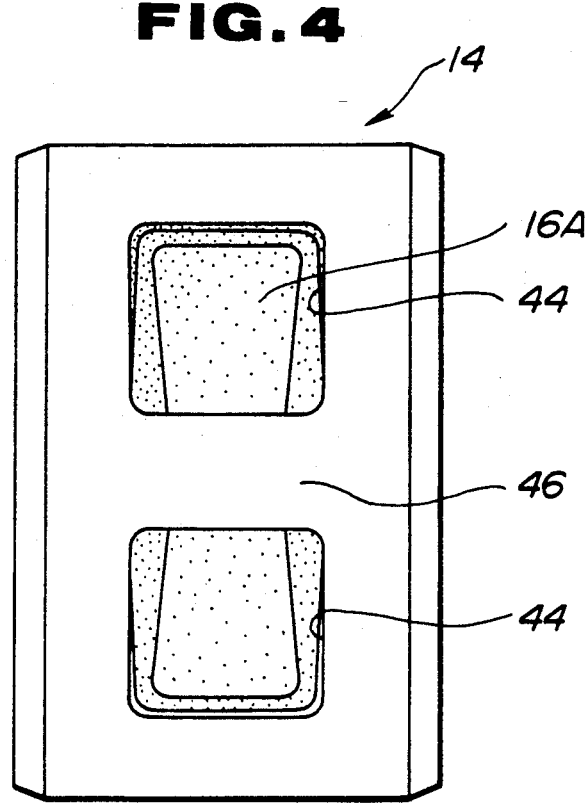
FIG. 4 is a side elevation of the first embodiment as seen along line IV—IV of FIG. 5.

As best seen in FIG. 4, the outer member 14 is formed with two openings or cut-outs 44. These openings are separated by a bridge portion 46 which extends in the axial direction of the outer member 14.

Figure 5:
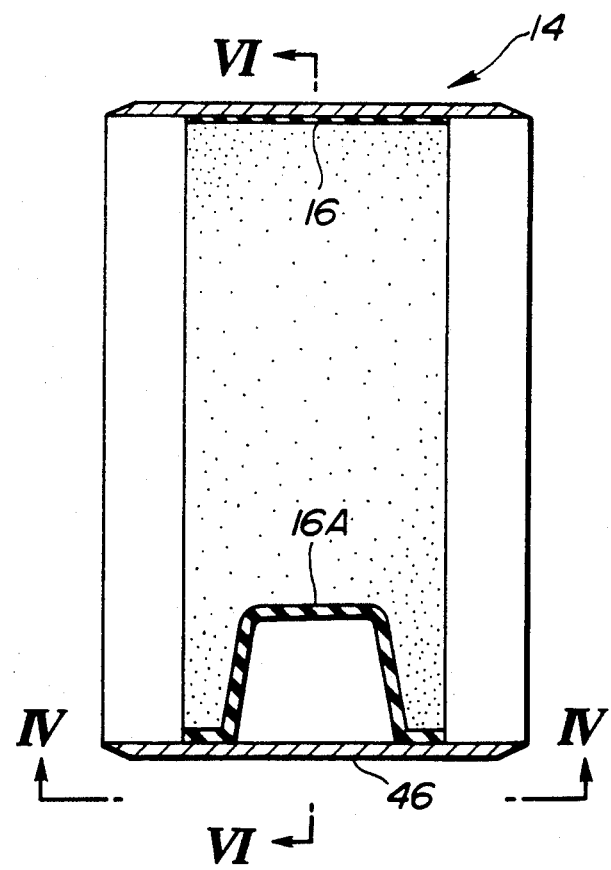
FIG. 5 is a side elevation taken along section line V—V of FIG. 6.
Figure 6:
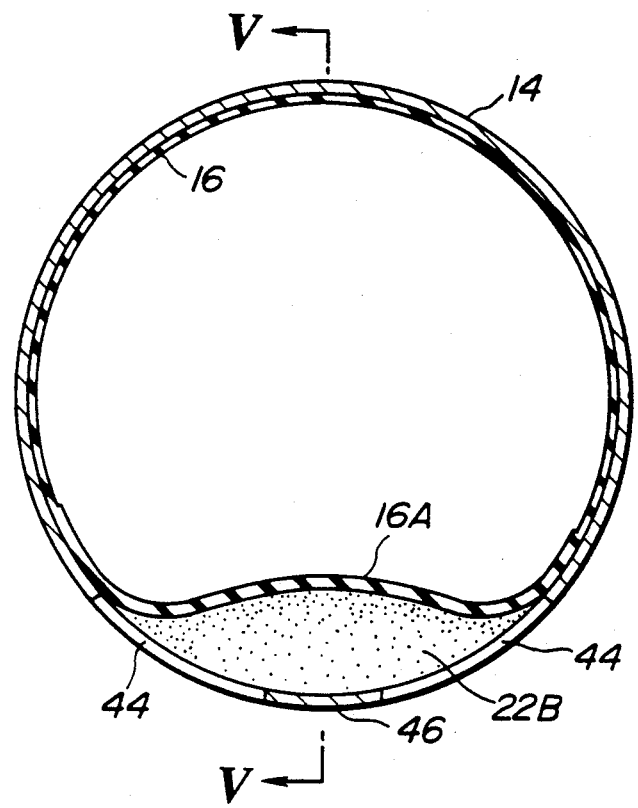
FIG. 6 is a view as taken along section line VI—VI of FIG. 5.

FIGS. 5 and 6 show a variant of the first embodiment wherein the thickness of the elastomeric layer is increased in the region of the diaphragm 16A.

ASSEMBLY

The assembly of the above embodiment is such that the inner member 12 and the annular insert 18 are vulcanized to the elastomeric body 20. The recess in the elastomeric body which defines the fluid chamber 26, is oriented to face the cut-out portion 18A of the annular insert.

As previously mentioned, a selected portion of the elastomeric layer 16 is vulcanized to the inner periphery of the outer member 14. The nonvulcanized portion of the elastomeric layer 16 of course defines the diaphragm 16A.

The two pieces are then immersed in a bath of working fluid and the main body (viz., a body comprised of elements 12, 20, 18, 31, 31, 42, 42, 28) is inserted into the outer member 14 in a manner which ensures that fluid chamber 26 and the orifice passage 32 become completely filled with working fluid.

In this instance the inner diameter of the elastomeric layer 16 is selected to be greater than the inner diameter of the outer member 14 by about 2 mm. This ensures that the diaphragm portion 16A exhibits an adequate amount of flexibility in both directions. The arrangement of the diaphragm also ensures that the so called main body and outer member 14 can be readily manipulated by an operator another until the correct relationship is established for axial insertion. Accordingly, even though the assembly is carried while immersed in the working fluid, assembly wherein the recess formed in the elastomeric body faces the diagram in the desired manner is facilitated.

Following the insertion the outer member 14 is subject to compression to fix the two bodies together into a single unit.

It should be appreciated that, as the assembly is carried while the components are immersed in the working fluid, the working chamber 26A, expansion chamber 26B and interconnecting orifice passage 32 are completely filled with fluid. After being removed from the fluid, any remnant fluid in the air chamber 22B defined between the diaphragm 61A and the outer member 14 can readily drain and/or be removed without troublesome removal and cleaning efforts being required.

Further, with the above technique an accurate positioning of the outer member 14 with respect to the inner assembly is possible, any possibility of imperfect sealing of the orifice passage 32 and/or leakage from the fluid chamber 26 is prevented.

Figure 7:
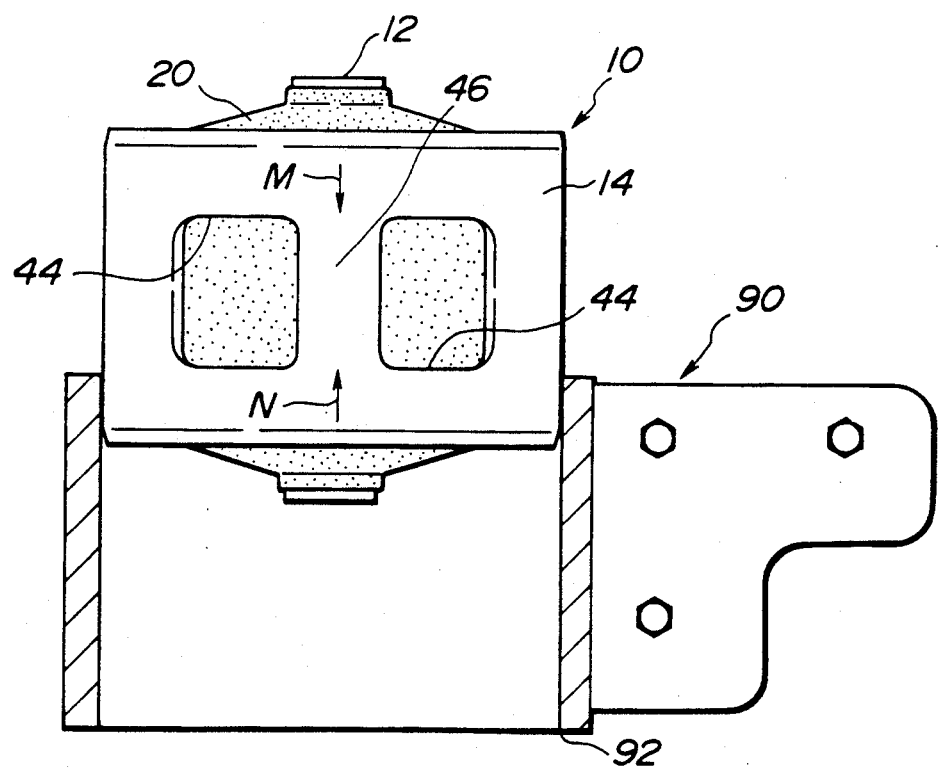
FIG. 7 is a plan view showing the bush according to the present invention force fitted into a mounting bracket.

As shown in FIG. 7 with a vibration damping arrangement of the nature disclosed above, when it is force fitted into the cylindrical connection member 92 which forms part of the bracket 90 which is rigidly connected to the vehicle chassis, the friction which develops between the outer member 14 and the cylindrical connection member 92, produces a reaction force N which acts against the force M which is being applied to the other end of the outer member 14. However, in this case as the bridge portion 46 exhibits a high rigidity in the direction the two force act, any tendency for the outer member 14 to undergo deformation due to the provision of the openings 44, is negated.

As a result of the outer member 14 being highly resistant to deformation during the force fitting process, the longevity and characteristics of the device are prevented from deterioration. Further, any tendency for the O rings 42 to deteriorate due to excessive displacement and/or pressure is negated.

SECOND EMBODIMENT

Figure 8:
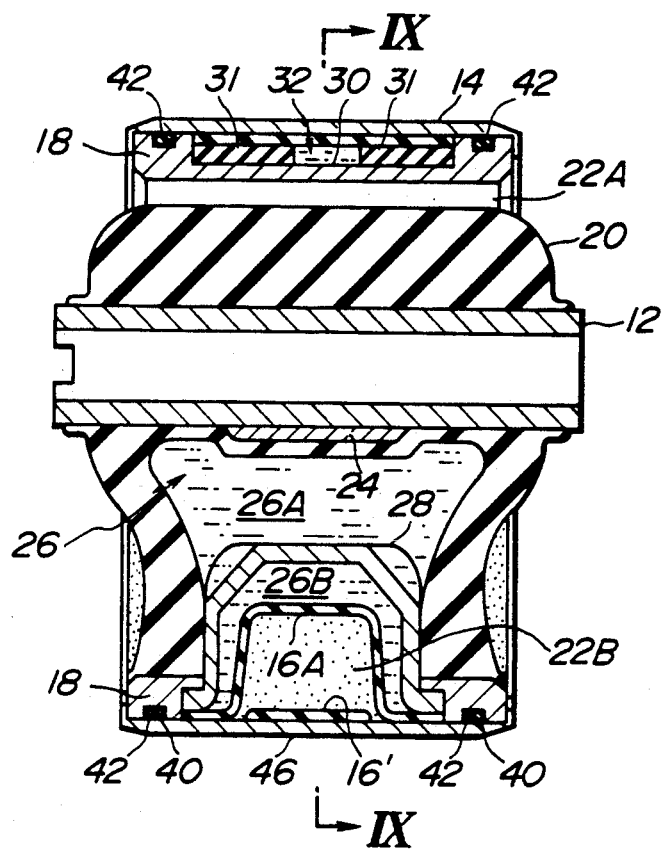
FIG. 8 is a side sectional view of a second embodiment of the present invention as taken along section line VIII—VIII of FIG. 9.
Figure 9:
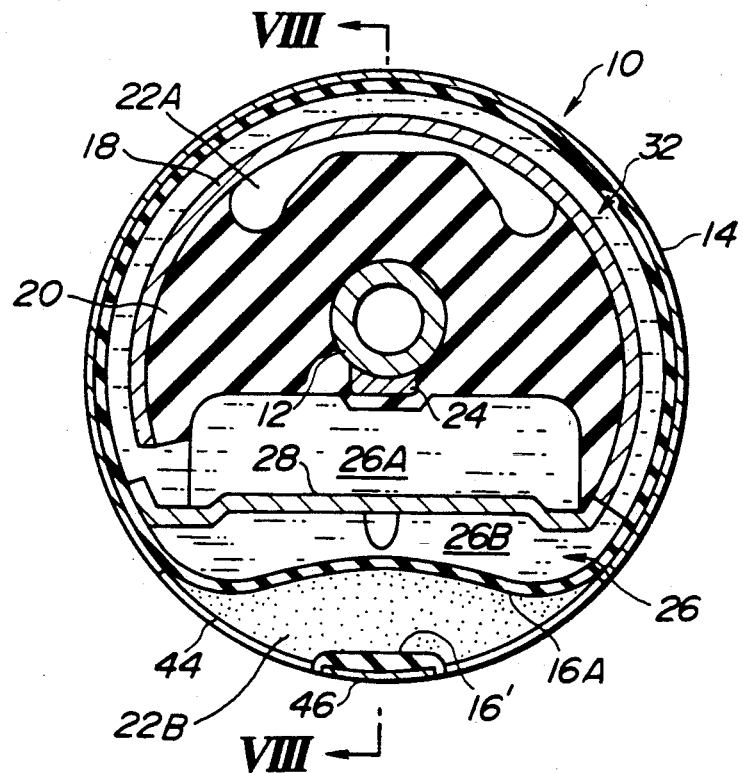
FIG. 9 is a front sectional view as taken along section line IX—IX of FIG. 8.
Figure 10:
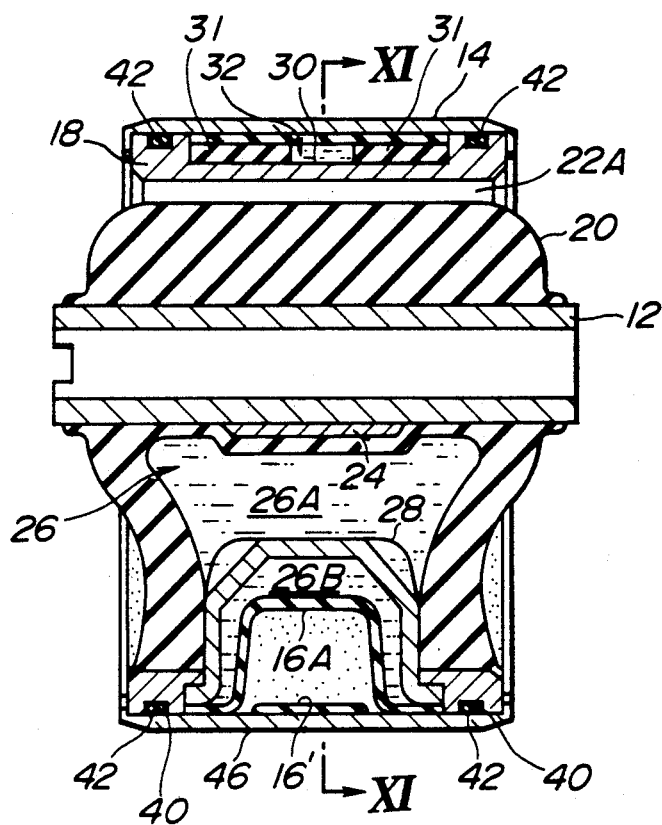
FIG. 10 is a side sectional view of a third embodiment of the present invention as taken along section line X—X of FIG. 11.

FIGS. 8 and 9 show a second embodiment of the present invention.

In this arrangement a relatively small, so as to not interfere with free air flow into and out of the air chamber 22B, rectangular piece of elastomeric sheet 16' is bonded or vulcanized to the inner wall of the bridge portion 46. This sheet serves to protect the diaphragm 16A from undergoing abrasion and the like upon being forced into contact with the bridge portion 46. With this provision the longevity of the diaphragm 16A is improved.

It should be noted that is possible that the corners of the elastomeric sheet 16' should have a radius of more than 10 mm.

THIRD EMBODIMENT

Figure 11:
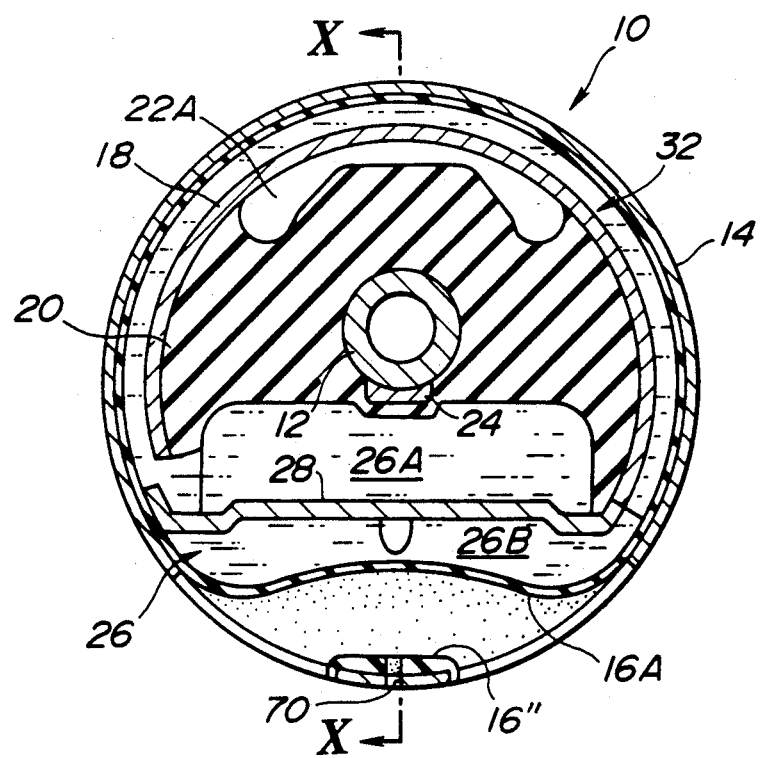
FIG. 11 is a front sectional view as taken along section line XI—XI of FIG. 10.
Figure 12:
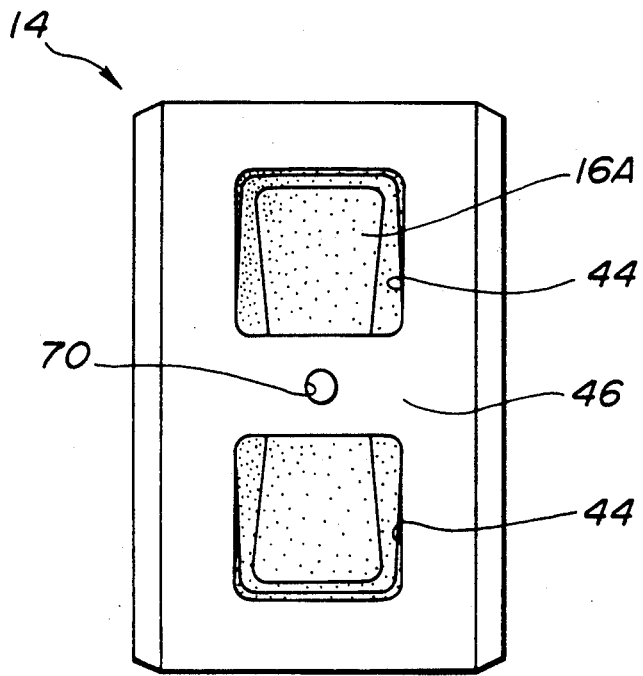
FIGS. 12 and 13 show a fourth embodiment of the present invention.

FIGS. 11 and 12 show a third embodiment of the present invention.

In this arrangement a circular opening 70 is formed in the bridge portion 46. This opening 70 is provided so that when the bush is fully force fitted into the bracket, it can be aligned with a non-illustrated through hole (or holes) in the cylindrical connection member 92 in a manner to permit free fluid communication between the air chamber 22B and the ambient atmosphere.

In this embodiment the protective elastomeric sheet 16'' is provided and formed with an opening which is coaxial with that formed in the bridge portion 46 and arranged to wrap around the side edges of the bride portion 46 in a manner which protects the diaphragm 16A from potentially sharp edges.

FOURTH EMBODIMENT

Figure 13:
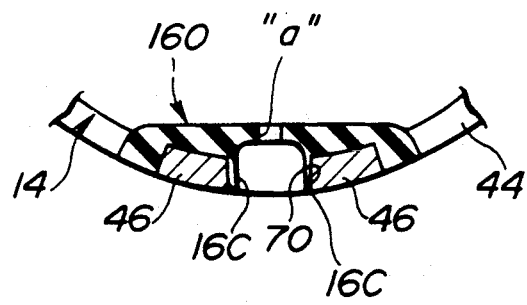
Figure 14:
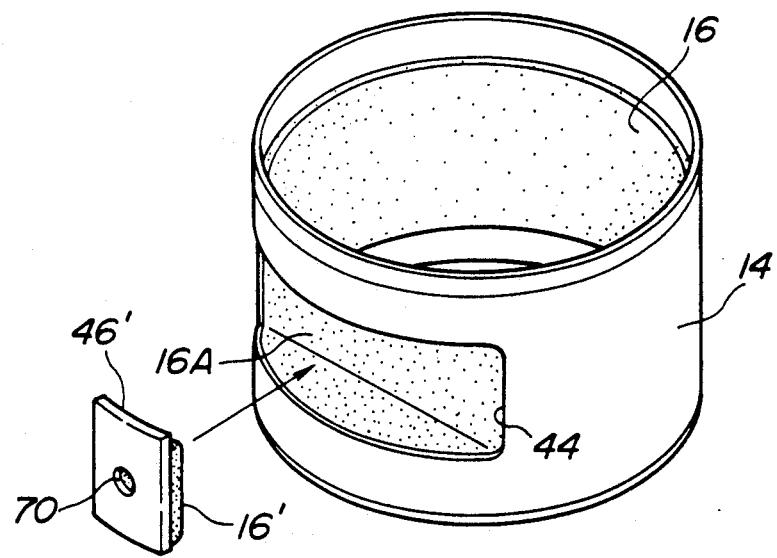
FIG. 14 shows a fifth embodiment of the present invention wherein the reinforcement bridge member is formed separately from the main body of the outer member.

FIG. 13 shows a fourth embodiment of the invention wherein the protective sheet 160 has a grommet-like configuration. In this embodiment the sheet is formed with a thin wall tubular portion 16C is vulcanized to the wall of the opening 70 formed in the bridge portion. A relatively small essentially co-axial opening "a" is formed in the sheet so as to define a kind of stepped bore-like arrangement via which communication with the ambient atmosphere can be established. The diameter of the opening "a" is kept small to prevent the diaphragm 16A from bulging into the opening and undergoing localized deformation upon engaging the sheet.

The sheet is arranged to wrap around the sides of the bridge portion 46.

FIFTH EMBODIMENT

In this arrangement the bridge portion 46 is formed separately (nonintegrally) from the outer member 14, provided with a protective sheet 16' and bonded in place prior insertion of the bush into the mounting bracket. Of course it is possible with this embodiment to readily provide a plurality of bridges if desired.

SIXTH EMBODIMENT

Figure 15:
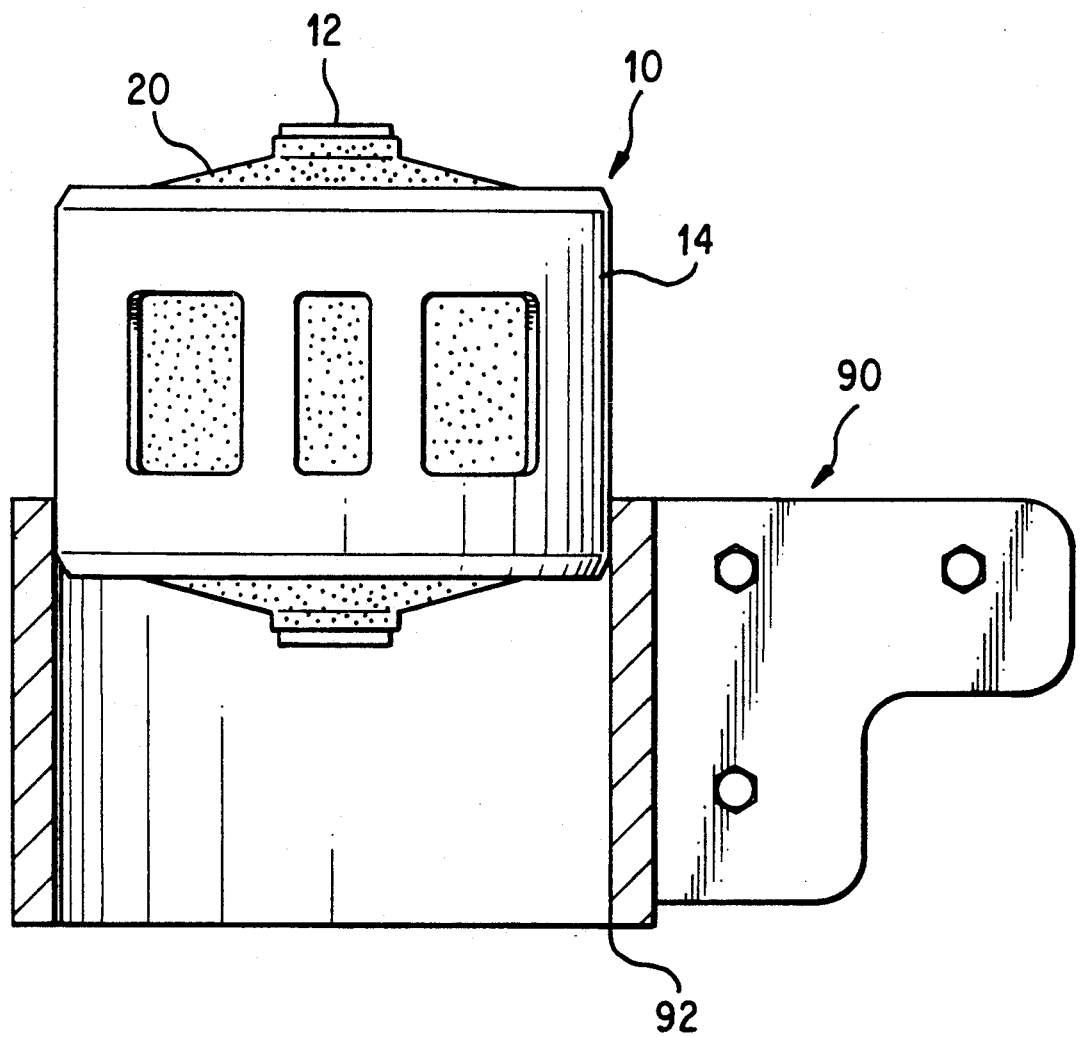
FIG. 15 shows a sixth embodiment of the present invention, having a plurality of reinforcing bridge members.

FIG. 15 shows a sixth embodiment of the present invention. In this embodiment a plurality of reinforcing bridge members 46 extend in the axial direction of the outer member 14.

In fact, in addition to the sixth embodiment, all of the previously described embodiments may be formed with more one bridge portion if deemed appropriate.

Further variations and modification which can be made to the above type of bush will be apparent in view of the forgoing disclosure.

What is claimed is:

1. A bush comprising:
    outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into a bush receiving portion of a mounting bracket;
    means for defining an air chamber having an enclosure comprising a diaphragm and a predetermined portion of said outer member;
    means defining an opening in a portion of said outer member facing said diaphragm, said opening being elongate in a circumferential direction of said outer member and having substantially the same size in an elevation view as that of said diaphragm; and
    reinforcing means consisting of a bridge member which is elongate in an axial direction of the outer member, said bridge member extending from an edge of the opening through said opening to an opposite edge of the opening for reinforcing the opening against forces which act in a direction parallel with said first axis, and which divides the opening into first and second discrete portions.

2. A bush comprising:
    outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into a bush receiving portion of a mounting bracket;
    means for defining an air chamber having an enclosure comprising a diaphragm and a predetermined portion of said outer member;
    means defining an opening in the predetermined portion of said outer member, said opening being so sized and dimensioned that air may freely flow without restriction in and out of the air chamber;
    reinforcing means for reinforcing the opening against forces which act in a direction parallel with said first axis; and
    a protective layer formed on the inner surface of said reinforcing means, said layer being arranged to protect said diaphragm from damage, said protective layer comprising an elastomeric sheet which is fixed to an entire inner wall of said reinforcing means and which covers at least one of a plurality of side edges of said reinforcing means.

3. A bush as claimed in claim 2 further comprising means defining a through hole which extends through said reinforcing means and said protective layer.

4. A bush as claimed in claim 3 wherein said reinforcing means comprises a bridge member which extends across said opening in a direction essentially parallel with the first axis.

5. A bush comprising:
    outer and inner members, said outer and inner members being operatively interconnected by an elastomeric body and having first and second axes respectively, said inner member being disposed within the outer member so that the first and second axes are essentially parallel, said outer member being essentially cylindrical and so dimensioned as be force fittable into the bush receiving portion of a mounting bracket;
    means for defining an air chamber having an enclosure comprising a diaphragm and a predetermined portion of said outer member;
    means defining first and second relatively large openings in the predetermined portion of said outer member, said first and second openings being large enough to permit air to freely flow in and out of the air chamber and any liquid in the air chamber to readily drain therefrom;
    a bridge member which extends between said first and second relatively large openings in a direction essentially parallel with the first axis;
    a protective layer formed on an inner surface of said bridge member, said layer being arranged to prevent said diaphragm from directly contacting said reinforcing means;
    means defining a through hole which extends through said reinforcing means and said protective layer; and
    wherein said protective layer comprises an elastomeric sheet which is bonded entirely to the bridge and is formed to wrap around side edges of the bridge said elastomeric sheet being so sized and dimensioned that any restriction to air flow in and out of the air chamber is absent.

6. A bush comprising:
    outer and inner members, said outer and inner members having first and second axes respectively, said inner member being disposed within the outer member so that the first and second axes are essentially parallel;
    an elastomeric layer, a first part of said elastomeric layer being fixed to a first predetermined portion of an inner periphery of said outer member, a second part of said elastomeric layer being arranged to act as a diaphragm and forms an air chamber;
    an elastomeric body which is connected to the inner member and formed with a recess, the recess and the portion of said elastomeric layer which acts as a diaphragm, defining in combination with a structural member, chamber means which is filled with a working fluid;
    passage means in a second predetermined portion of said outer member which communicates with said air chamber, said passage means having reinforcing means which extends parallel to said first axis and divides the passage means into first and second sections each having a greater total peripheral opening dimension in a direction substantially perpendicular to said first axis than a peripheral dimension of said reinforcing means.

7. A bush comprising:
    a cylindrical outer member which is adapted to be force fitted into a mounting bracket;

means defining an air chamber within the cylindrical outer member;

air chamber drain means for facilitating the drainage of fluid which enters the air chamber during manufacture, said air chamber drain means comprising an opening which extends circumferentially along a predetermined portion of said outer member; and a plurality of bridge members which extend across said opening in a direction essentially parallel with an axis of said cylindrical outer member.

8. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining a diaphragm which cooperates with the outer member to define an air chamber;

means defining an opening in a predetermined portion of said outer member, said opening being elongate in a circumferential direction of said outer member and having essentially the same length in a circumferential direction of said outer member as the diaphragm taken in the circumferential direction; and reinforcing means in the form of a bridge member which is elongate in an axial direction of the outer member, said bridge member extending from an edge of the opening through said opening to an opposite edge of the opening for reinforcing the opening against forces which act in a direction parallel with said first axis, and which divides the opening into first and second discrete portions which are essentially rectangular in shape.

9. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining an air chamber having an enclosure comprising a diaphragm and a predetermined portion of said outer member;

means defining an opening in the predetermined portion of said outer member, said opening being so sized and dimensioned that air may freely flow without restriction in and out of the air chamber;

reinforcing means for reinforcing the opening against forces which act in a direction parallel with said first axis; and a protective layer formed on an inner surface of said reinforcing means, said layer being arranged to protect said diaphragm from damage, said protective layer comprising an elastomeric sheet which is fixed over an entire surface of an inner wall of said reinforcing means.

10. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining an air chamber comprising a diaphragm and a predetermined portion of said outer member;

means defining first and second relatively large openings in the predetermined portion of said outer member, said first and second openings being sufficiently large to permit air to freely flow in and out of the air chamber and any liquid in the air chamber to readily drain therefrom;

a bridge member having an inner surface and a plurality of side edges, which extends between said first and second relatively large openings in a direction essentially parallel with the first axis;

a protective layer formed on the inner surface of said bridge member, said layer being arranged to prevent said diaphragm from directly contacting said reinforcing means;

means defining a through hole which extends through said reinforcing means and said protective layer; and wherein said protective layer comprises an elastomeric sheet which is bonded entirely to the bridge and is formed to wrap around the side edges of the bridge, said elastomeric sheet being so sized and dimensioned that any restriction to air flow in and out of the air chamber is absent.

11. A bush comprising:

outer and inner members, said outer and inner members having first and second axes respectively, said inner member being disposed within the outer member so that the first and second axes are essentially parallel, said outer member being essentially cylindrical;

an elastomeric layer, a first part of said elastomeric layer being fixed to a first predetermined portion of an inner periphery of said outer member, a second part of said elastomeric layer being formed as an air chamber diaphragm, said air chamber diaphragm being arranged such that an air chamber is defined between said air chamber diaphragm and a second predetermined portion of said outer member;

an elastomeric body which is connected to the inner member and formed with a recess, the recess and the part of said elastomeric layer which acts as a diaphragm, forming in combination with a structural member, a chamber means which is filled with a working fluid; and passage means in said outer member which communicates with said air chamber, said passage means having reinforcing means which extends parallel to said first axis and divides the passage means into first and second sections which each have a greater total opening dimension in the direction of the first axis than in a circumferential direction, said circumferential direction having an axis of radius parallel with said first axis.

12. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining an air chamber having an enclosure comprising a diaphragm, a predetermined portion of said inner member, and a predetermined portion of said outer members;

means defining an opening in said predetermined portion of said outer member;

reinforcing means for reinforcing said opening against forces which act in a direction parallel with said first axis;

a protective layer formed on an inner surface of said reinforcing means, said layer being arranged to prevent said diaphragm from directly contacting said reinforcing means; and a through hole which extends through said reinforcing means and said protective layer, wherein said through hole is stepped, the smaller diameter portion being defined in said protective layer.

13. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining an air chamber having an enclosure comprising a diaphragm and a predetermined portion of said outer member;

means defining an opening in said predetermined portion of said outer member;

reinforcing means for reinforcing said opening against forces which act in a direction parallel with said first axis, said reinforcing means comprising a bridge member which extends across said opening in a direction essentially parallel with the first axis, said bridge being formed separately from said outer member and fixedly attached thereto;

a protective layer formed on an inner surface of said reinforcing means, said layer being arranged to prevent said diaphragm from directly contacting said reinforcing means; and means defining a through hole which extends through said reinforcing means and said protective layer.

14. A bush comprising:

outer and inner members, said outer and inner members being operatively interconnected by an elastomeric body and having first and second axes respectively, said inner member being disposed within the outer member so that the first and second axes are essentially parallel, said outer member being essentially cylindrical and dimensioned to be force fittable into the bush receiving portion of a mounting bracket;

means defining an air chamber having an enclosure comprising a diaphragm and a predetermined portion of said outer member;

means defining an opening in the predetermined portion of said outer member;

reinforcing means for reinforcing the opening against forces which act in a direction parallel with said first axis, said reinforcing means comprising a plurality of bridge members which extend across said opening in a direction essentially parallel with the first axis; and a protective layer formed on an inner surface of said reinforcing means, said layer being arranged to prevent said diaphragm from directly contacting said reinforcing means;

means defining a through hole which extends through said reinforcing means and said protective layer.

* * * * *